United States Patent
Barreda

(10) Patent No.: US 11,313,109 B2
(45) Date of Patent: Apr. 26, 2022

(54) VALVE FOR CONTROLLING WATER FLOW AND FOR IMPROVING WATER METER HEALTH AND READINGS

(71) Applicant: MICROFLOW, LLC. A DELAWARE LIMITED LIABILITY COMPANY, Marietta, GA (US)

(72) Inventor: Fabian Mauricio Barreda, Miami, FL (US)

(73) Assignee: MICROFLOW, LLC, A DELAWARE LIMITED LIABILITY COMPANY

( * ) Notice: Subject to any disclaimer, the term of this patent is extended or adjusted under 35 U.S.C. 154(b) by 0 days.

(21) Appl. No.: 15/946,449

(22) Filed: Apr. 5, 2018

(65) Prior Publication Data

US 2019/0309501 A1  Oct. 10, 2019

(51) Int. Cl.
*E03B 7/07* (2006.01)
*F16K 15/06* (2006.01)

(52) U.S. Cl.
CPC .............. *E03B 7/075* (2013.01); *E03B 7/072* (2013.01); *F16K 15/063* (2013.01)

(58) Field of Classification Search
CPC ........ E03B 7/075; E03B 7/072; F16K 15/063; F16K 27/0209; F16K 15/028; G01F 15/005
See application file for complete search history.

(56) References Cited

U.S. PATENT DOCUMENTS 1,828,697 A   10/1929 Yardley
1,860,004 A   3/1930 Yardley
1,811,166 A   4/1930 Yardley
2,594,641 A   8/1946 Griffith
4,091,838 A   5/1978 Dowty
(Continued)

FOREIGN PATENT DOCUMENTS

JP   57-154565   9/1982

OTHER PUBLICATIONS

International Search Report and Written Opinion for corresponding PCT Application No. PCT/US 2019/020303 dated May 30, 2019.

*Primary Examiner* — Peter J Macchiarolo
*Assistant Examiner* — John M Royston
(74) *Attorney, Agent, or Firm* — Daniel S. Polley, P.A.

(57) ABSTRACT

A water flow valve positioned within a waterline preferably just past a building's water meter. The valve compresses air bubbles into the water at the point where the water enters the meter, thus improving the accuracy of the meter reading. The internal passageway of the valve is non-linear and causing the water traveling therethrough to go through a plurality of turns. A blocking disk and spring are used to close off communication between a first portion of the internal passageway and a second portion of the passageway in a valve closed position. With enough water flow pressure the spring is compressed which causes the blocking disk to retract and allow water to travel through the passageway, while creating the backpressure in the waterline to collapse the air bubbles prior to the bubbles being read by the water meter. A laminar flow for the water can also be created which can reduce the wear and tear on the water meter possibly extending the useful life for the water meter.

20 Claims, 6 Drawing Sheets

(56) References Cited

U.S. PATENT DOCUMENTS

| | | |
|---|---|---|
| 4,271,862 A | 6/1981 | Snoek |
| 4,691,727 A | 9/1987 | Zorb |
| 4,930,539 A | 6/1990 | van Rooy |
| 5,246,031 A | 9/1993 | Eichler |
| 5,806,558 A | 9/1998 | Greverath |
| 5,921,275 A | 7/1999 | Knop |
| 6,866,062 B2 * | 3/2005 | Lammers .............. F16K 15/063 137/513.7 |
| 7,431,048 B2 | 10/2008 | Fangmeier |
| 8,408,244 B2 | 4/2013 | Gilcher |
| 8,944,098 B1 | 2/2015 | Bocos |
| 2004/0045607 A1 | 3/2004 | Lammers |
| 2006/0260463 A1 | 11/2006 | Wegkamp |
| 2007/0277887 A1 | 12/2007 | Imler |
| 2009/0193908 A1 | 8/2009 | Dana |
| 2009/0289207 A1 | 11/2009 | Barreda |
| 2012/0118406 A1 | 5/2012 | Edgeworth |
| 2013/0228241 A1 * | 9/2013 | Gass ....................... E03B 7/078 137/512 |
| 2014/0130873 A1 | 5/2014 | Brody |

* cited by examiner

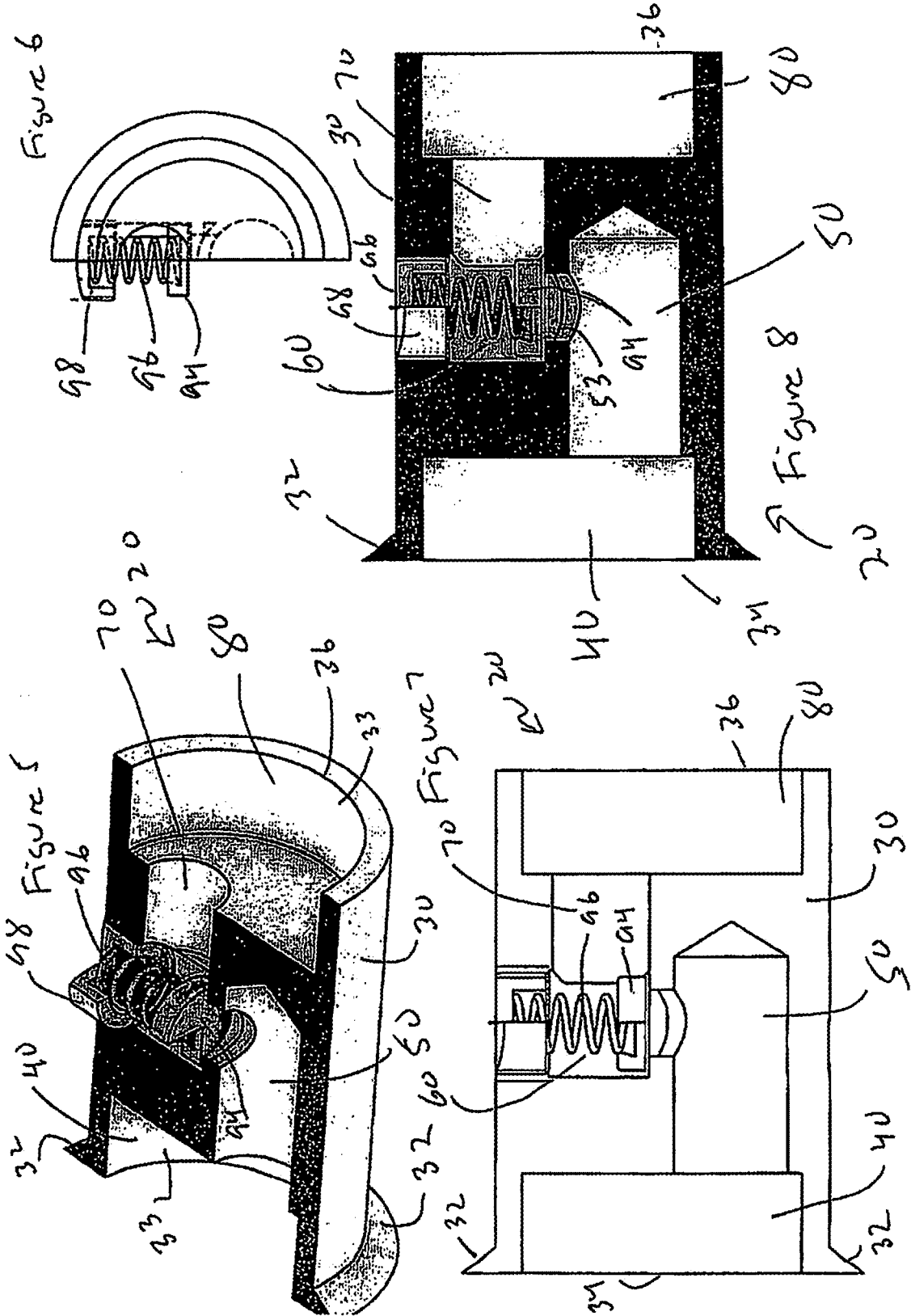

VALVE FOR CONTROLLING WATER FLOW AND FOR IMPROVING WATER METER HEALTH AND READINGS

FIELD OF THE INVENTION

The present invention relates generally to water valves and in particular to a water flow valve disposed within a water line for improving the accuracy of readings from an associated water meter as well as for extending the useful life of the water meter.

BACKGROUND OF THE INVENTION

One inefficiency with current water lines, such as, but not limited to, water lines for a building or house, is that the water meter in the water line reads the water passing through which contains gas/air bubbles which causes the amount indicated to be higher than the actual amount of water that did pass through. The water meter merely reads the volume of water passing through and the air bubbles increase the volume. Thus, the water customer (homeowner, apartment owner, business owner, etc.) is charged and pays for a higher amount of water than was actually received. It is to the effective resolution of the above-identified problem that the present invention is directed.

SUMMARY OF THE INVENTION

The present invention relates generally to a water flow valve installed within a water line at a point in the water line between the water meter and the dwelling/building to which the water meter is associated with. The water flow valve is preferably positioned just after the water meter so increase its ability to collapse bubbles in the water prior to the water passing through the water meter. When installed within the water line, the novel valve compresses the air/air bubbles into the water preferably at the point where the water enters the meter causing the bubbles to collapse. As such, the meter read less volume when the water passes through it and the volume read is more consistent with the actual amount of volume of water that was received.

Preferably, the air is compressed through the creation by the valve of back pressure in the water line. With this increase pressure, the air bubbles in the water begin to collapse and occupy less space. When the water, with collapsed air bubbles, passes through the meter, the meter reads basically only the water volume and as preferably only relatively small or trivial amount of air volume remains in the water. Thus, the water bill generated from readings by the meter will be lower and reflect a much more accurate reading of the actual amount of water that was delivered to the building, as compared to if the disclosed novel valve had not been placed within the water line.

The disclosed novel water flow valve preferably can be comprised of a body member, which is preferably a one-piece body member. The body member defines a non-linear internal passageway extending from an open first end to an open second end of the body member. The internal passageway is provided in several sections and preferably extends through a series of turns.

A portion of the body member can have a cutout or an opening to allow a blocking member, spring and cap to be disposed within the body member, with the blocking member and portion of the spring located within the internal passageway closing off communication between sections of the internal passageway in a valve "closed" position. One end of the spring is positioned against the surface of the blocking member and the other end of the spring is retained by the cap that is preferably disposed within the cutout/opening of the body member. The retained spring therefore exerts pressure against the disk pushing the disk against an internal wall and covering an internal opening in the closed position. Accordingly, where no water is running through the water line, the internal passageway of the body member will be closed by the spring pushing the blocking member over the internal opening. Preferably, the cap is secured within the body member opening by being threaded and mating with threads provided in the opening.

When water is flowing through the water line it will enter a first end of the internal passageway. Where the water flow creates enough pressure to overcome the force of the spring exerted on the disk/blocking member, the spring will be compressed which retracts the disk off the opening to continue to flow through the internal passageway and ultimately out of the internal passageway at the opening of the second end of the body member.

The activities experienced by the water within the internal passageway (i.e. going from larger diameter first section to smaller diameter second section, having to turn to go to the third section, pushing on the disk to compress the spring and/or turning again in the fourth section, etc.), causes a back pressure in the waterline which collapses the air bubbles (i.e. some or most of the air bubbles) preferably at the point in the water line just before the water with the air bubbles enters the water meter, such that the meter reading is more accurate and less effected by air bubbles in the water.

The collapsing of the water and control of the flow of the water just prior to the water meter can also causes the water entering into the water to have less of a "wear and tear" effect on the water meter and can extend the life of the water meter as an additional benefit of using the disclosed novel water valve.

BRIEF DESCRIPTION OF THE DRAWINGS

FIG. 6 is a partial end/sectional view of the novel water flow valve in accordance with the present disclosure;

FIG. 7 is another sectional view of the novel water flow valve in accordance with the present disclosure;

FIG. 8 is a further sectional view of the novel water flow valve in accordance with the present disclosure;

FIG. 9 is an exploded and valve body sectional view for the novel water flow valve in accordance with the present disclosure;

DETAILED DESCRIPTION OF THE DRAWINGS

Figure 1:
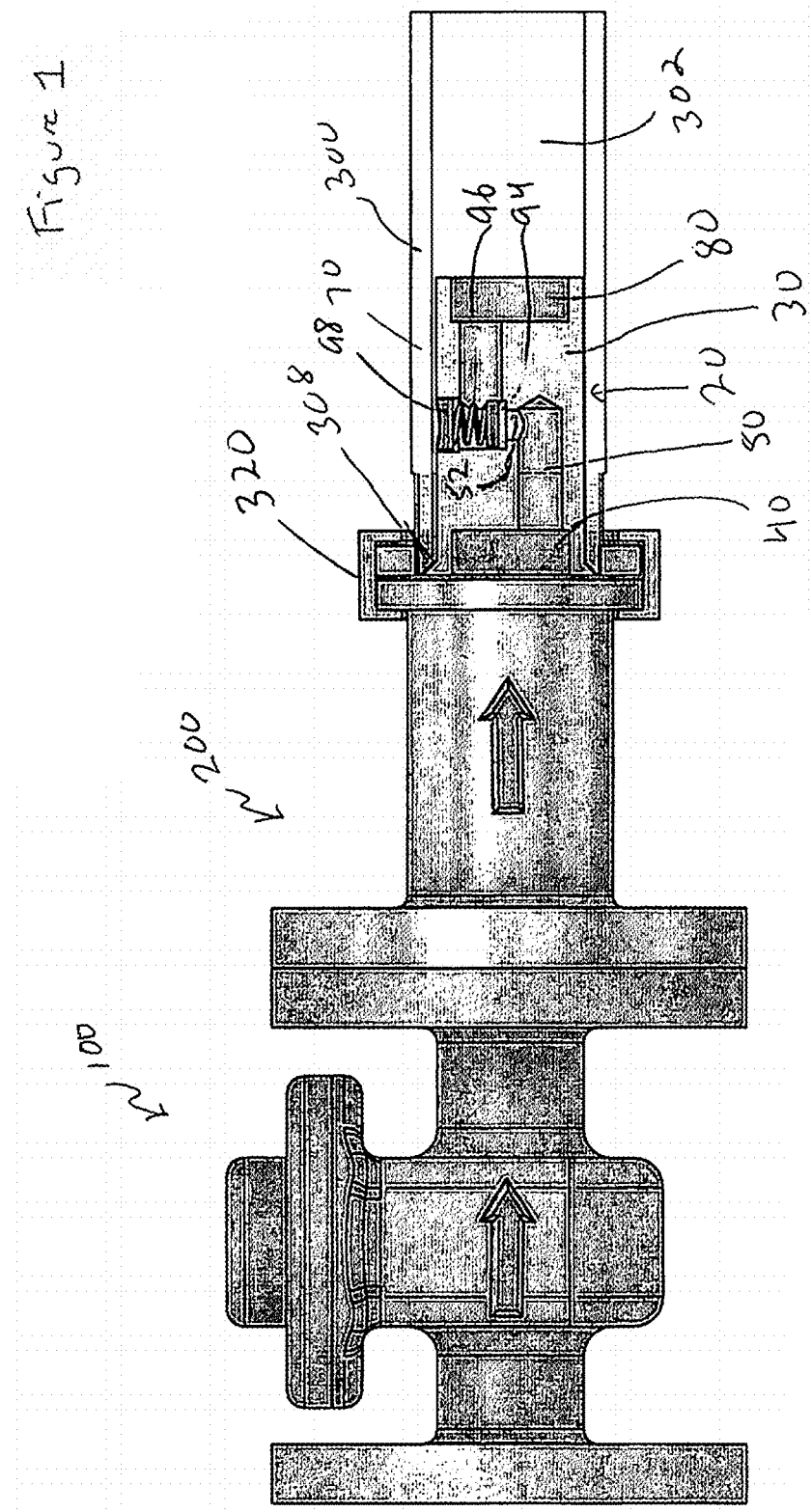
FIG. 1 illustrates a partial section view showing the novel water flow valve in use and installed within the waterline valve in accordance with the present disclosure.
Figure 2:
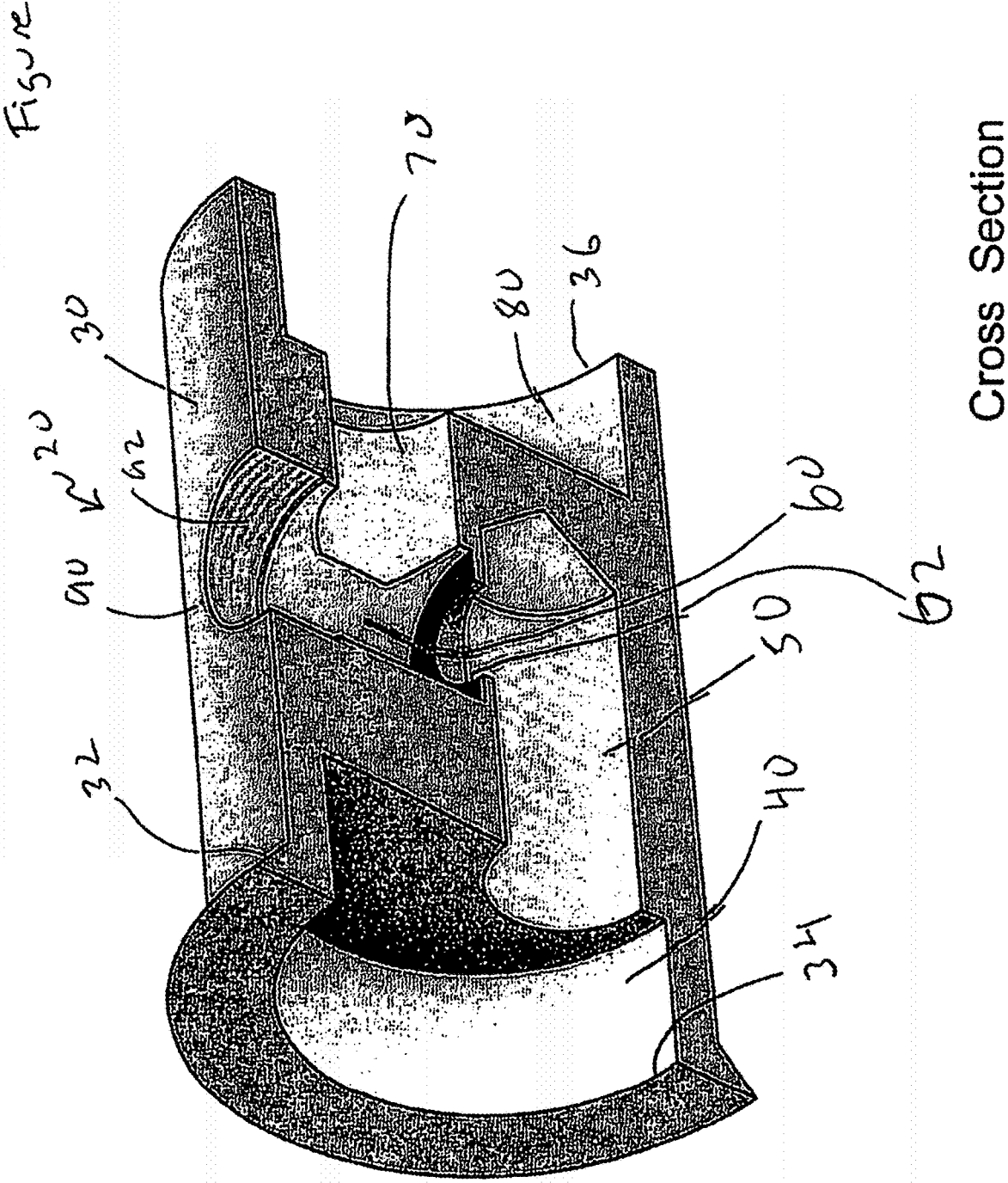
FIG. 2 is a sectional view of the valve body for the novel water flow valve in accordance with the present disclosure.
Figure 3:
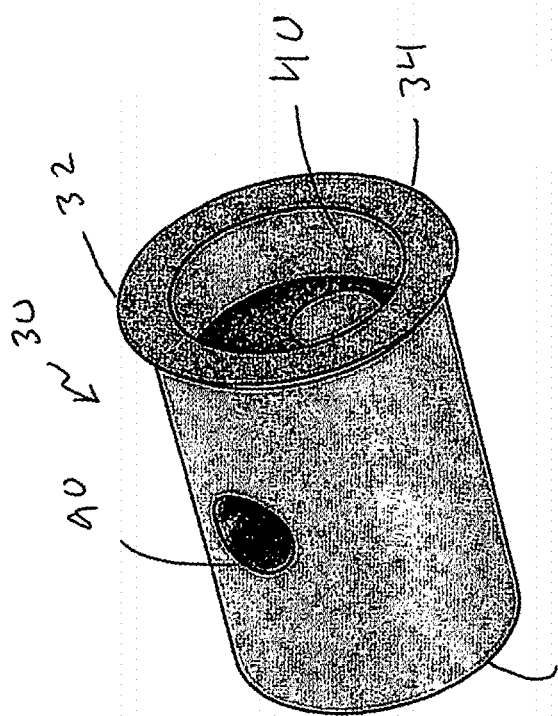
FIG. 3 is a perspective view of the valve body for the novel water flow valve in accordance with the present disclosure.
Figure 4:
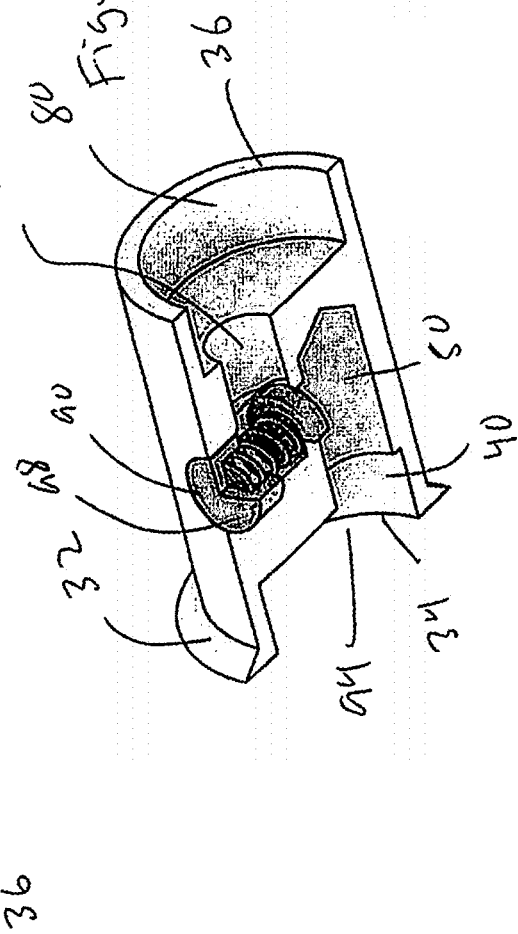
FIG. 4 is a sectional view of the novel water flow valve in accordance with the present disclosure.
Figure 5:
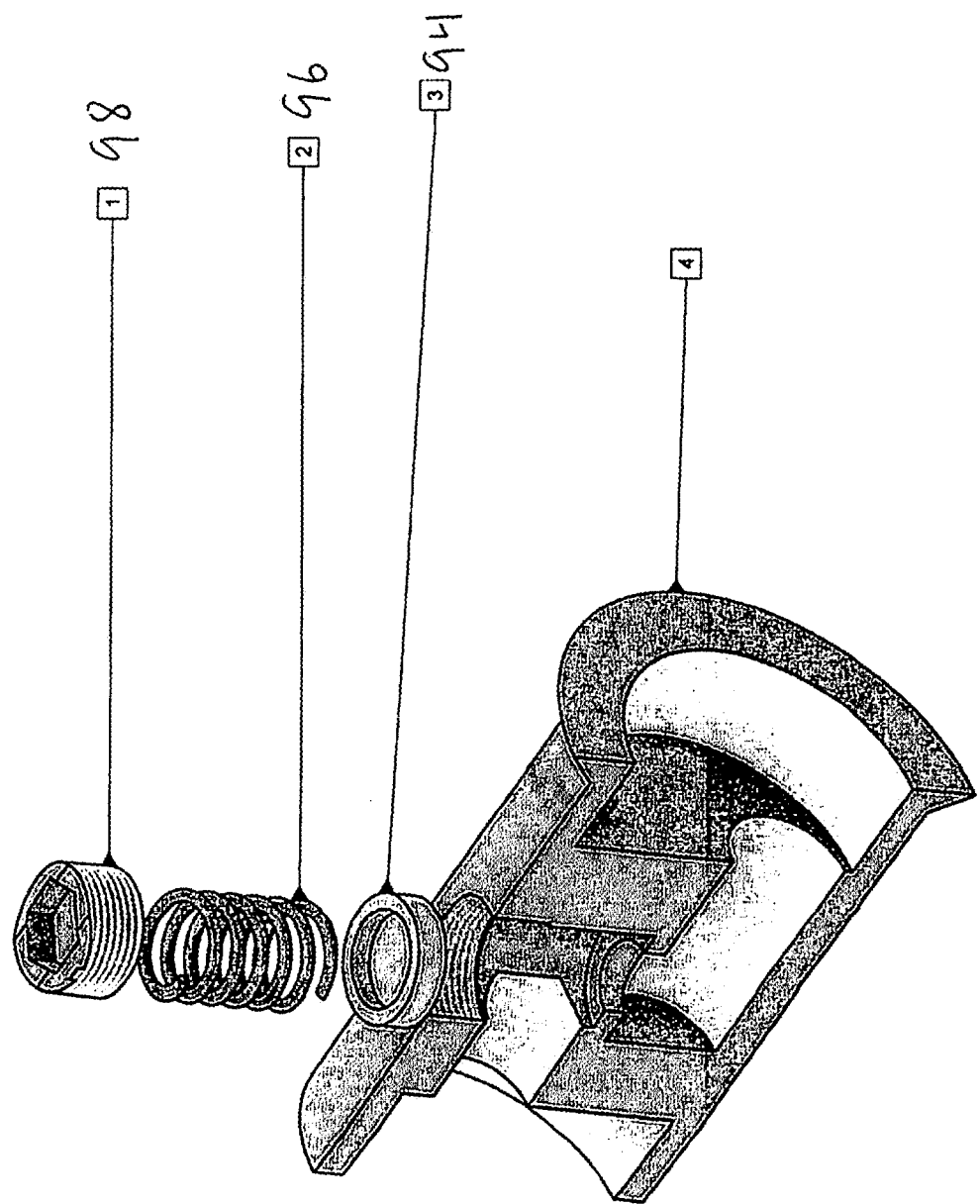
FIG. 5 is another sectional view of the novel water flow valve in accordance with the present disclosure.

As seen in the Figures, a novel water flow valve for installation within a waterline, preferably after the water meter (i.e. between the water meter and the dwelling/building) is provided for improving water meter reading accuracy and also preferably extending the useful life of the water meter. The novel valve is generally designated as valve 20. Valve 20 generally includes a body member 30 having a lip 32 at a first end 34 and an internal passageway extending from a first end 34 to an opposite second end 36 of the body member 30. Internal passageway 33 comprises several sections that can be in fluid communication with each other. A disk or other blocking member 94 can be provided for closing communication between two of the sections of the internal passageway and is retained in the "closed position" by a spring 96. A cap 98 is also provided for sealing the body member where the spring and disk are inserted and/or for maintaining spring 96 in position. Where enough pressure from water running through waterline 300 contact disk 94, spring 96 causing it to compress and allow the water to continue through internal passageway 33. This contact and/or the various turns that the water takes traveling through internal passageway also causes air bubbles in the water to collapse preferably just prior to the point where the water enters water meter 100 to be read. This causes water meter 100 to provide a more accurate reading of the volume of water that was delivered to the building/dwelling, etc.

As mentioned above, the novel water flow valve 20 preferably includes a body member 30, which is preferably a one-piece body member. The cross-sectional shape of body 30 can be cylindrical, though such is not considered limiting, and the cross-sectional shape can also be selected according to the cross-sectional shape of the pipe/plumbing used for waterline 300 of a water distribution system. Body member 30 defines a non-linear internal passageway 33 extending from an open first end 34 to an open second end 36 of body member 30. Body member 30 also has an outer lip 32 extend outward which acts as stop member when the rest of body member 30 is inserted within the internal passageway 302 of waterline 300 when installing valve 20. Lip 32 can preferably abut or run up against the end 308 of waterline 300, which is best seen in FIG. 1.

Figure 10:
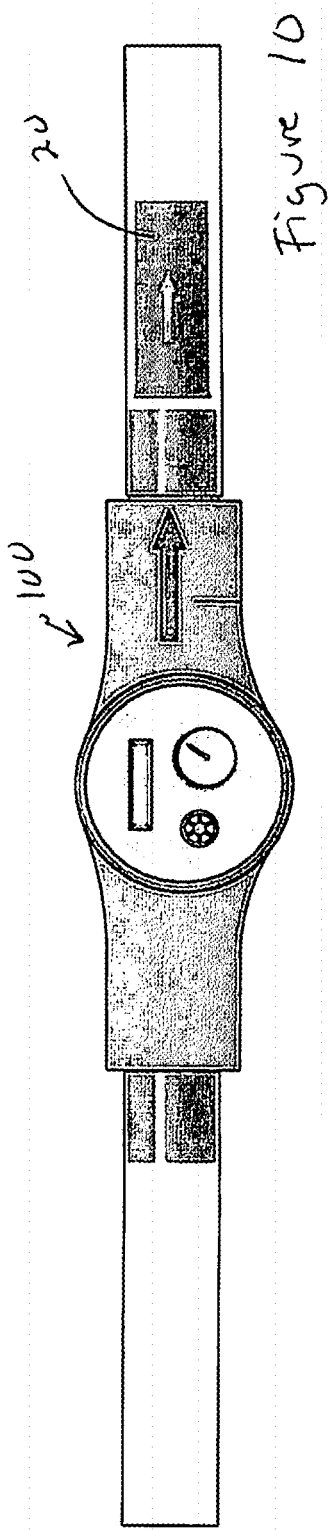
FIG. 10 is another alternative installed embodiment configuration for a waterline having the novel water flow valve and a water meter.
Figure 11:
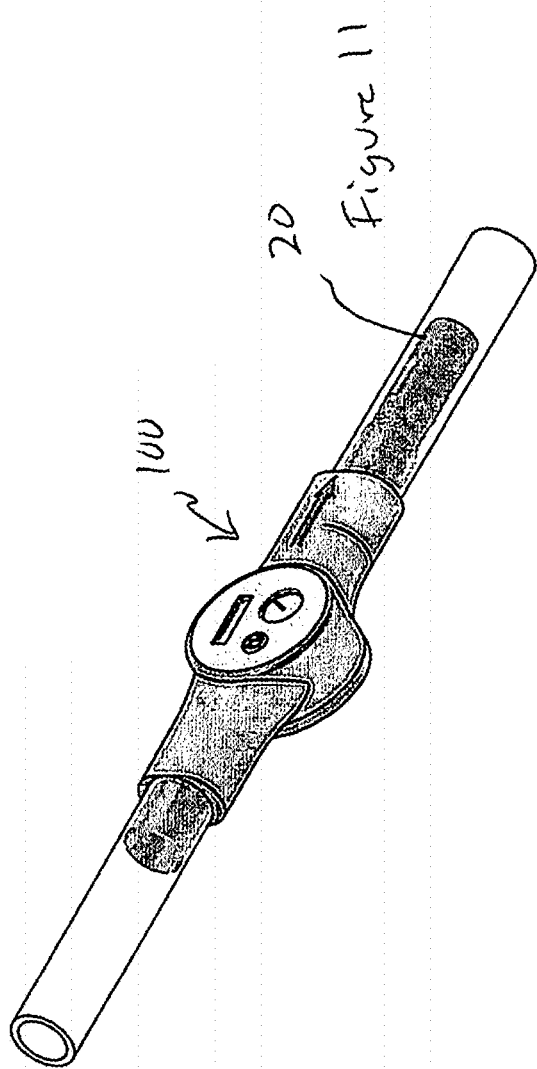
FIG. 11 is another view of the alternative configuration embodiment of FIG. 10.

As also seen in FIG. 1 in one non-limiting installation embodiment, a flange member 200 is conventionally connected to water meter 100. Valve 20, along with waterline pipe 300 is positioned next to the outer end of flange 200 and a coupling member 320 which is preferably provided with flange 200 is positioned over the outer end of flange 200, valve 20 and waterline pipe end 308. Coupling member is conventionally tightened (preferably creating a sealed connection between the various components), such as by screwing, tightening, thread tightening, tight fit, etc. FIGS. 10 and 11 illustrate another installation embodiment, and the present disclosure isn't considered limited to any one type of installation method, water meter, water line, etc.

Internal passageway 33 of body member 30 can be provided in several sections which preferably extends through a series of turns, as opposed to a linear or straight passageway. A first section 40 of internal passageway 33 can be preferably co-linear/parallel with the length of body member 30 and begins at the open first end 34 and continues within body member 30 at preferably the same internal diameter. Preferably, the internal diameter of first section 40 can be uniform throughout the first section. An internal end of first section 40 terminates into a second section 50 of internal passageway 33.

Second section 50 of internal passageway 33 also preferably runs co-linear/parallel with the length of body member 30 and is in fluid communication with first section 40 at the first end of second section 50. However, the internal diameter of second section 50 can be preferably smaller than the internal diameter of first section 40. In one embodiment, the internal diameter of second section 50 can be at least fifty (50%) percent smaller than the internal diameter of first section 40. Preferably, the internal diameter of second section 50 can be uniform throughout second section 50. The opposite end of second section 50 is preferably closed.

A small connector section 53 provides communication between second section 50 and third section 60. Connector section 53 runs perpendicular or substantially perpendicular to second section 50. A first end of connector section 53 intersects second section 50, preferably near the closed second end of second section 50 and a second end of connector section 53 intersects a first end of a third section 60 of internal passageway 33 at opening 62. Connector section 53 provides fluid communication between second section 50 and third section 60 (when valve 20 is in an "opened" position). Third section 60 runs colinear with connector section 53 and is also perpendicular or substantially perpendicular oriented with respect to second section 50, such that the water traveling through internal position is required to make an approximately ninety (90°) degree turn when traveling from second section 50 to third section 60.

Preferably, the internal diameter of third section 60 can be uniform throughout third section 60. A second end of third section 60 terminates into a cutout 90, preferably having threads 92, which is where cap/cover 90 is secured and when disk 94 and spring 96 can be inserted and positioned within third section 60.

A fourth section 70 of internal passageway intersect third section 60 near the outer end of third section 60 associated with cutout 90 to cause third section 60 and fourth section 70 to be in fluid communication with each other.

The fourth section preferably runs co-linear/parallel with the length of the body member. Thus, the water entering third section 60 through opening 62 (when the valve is in an "opened" position) is required to turn again (i.e. approximately 90 degrees) to enter into fourth section 70. The opposite end of fourth section 70 preferably terminates into the fifth and preferably final section 80 of internal passageway 33. Preferably, the internal diameter can be uniform throughout the fourth section 70. Fifth section 80 can include and open outer end that is located at open second end 36 of body member 30. Fifth section 80 preferably runs co-linear/parallel with the length of body member 30. The internal diameter of fifth section 80 can be uniform throughout fifth section 80. The internal diameter of fifth section 80 is preferably larger than the internal diameter of fourth section 70. Preferably, the internal diameter of fifth section 80 can be at least fifty (50%) percent larger in size than the internal diameter of fourth section 70.

Preferably, the size of the internal diameter of second section 50 can be larger than the internal diameter size of fourth section 70, though such is not limiting, and the internal diameters of the two sections can be the same or the internal diameter size of fourth section 70 can be larger than the internal diameter size of second section 50 and all configurations are considered within the scope of the disclosure.

A portion of body member 30 can have a cutout or an opening 90 to allow a blocking member 94, spring 96 and cap 98 to be disposed within body member 30, with blocking member 94 and a portion of spring 96 located within third section 60 of internal passageway 33. In one non-limiting embodiment, blocking member 94 can be a seating disk though such is not considered limiting. One end of spring 96 is positioned against the surface of blocking member 94 (or can be connected thereto) and the other end of spring 96 is retained by the cap 98 (or can be connected thereto) that is preferably disposed within cutout/opening 90 of body member 30. Retained spring 96 exerts pressure against disk 94 pushing disk 94 against a portion of the wall of one end of third section 60 preferably fully covering opening 62 therein cutting off fluid communication between second section 50 and third section 60 of internal passageway 33 om a valve "closed" position. Accordingly, where no water is running through waterline 300, internal passageway 33 of body member 30 will be closed at the intersection of connector section 53 and third section 60. Preferably, cap 98 secured within body member opening 90 by being threaded and mating with threads 92 preferably provided in opening 90. In one non-limiting embodiment, cap 98 can be a threaded hexagon socket or Phillips head screw cap, though such is not considered limiting.

When water is flowing through the water line pipe 300 it will enter internal passageway 33 through first section 40. Where the water flow creates enough pressure to overcome the force exerted on disk 94 by spring 96, spring 96 will compress which retracts disk 94 (automatically if attached to the end of spring 96 or by the force of the water flow) off opening 62 in third section 60 to allow the water to enter into the third section 60 and then be directed to fourth section 70 and ultimately out of internal passageway 33 at the opening of second end 36 of body member 30/outer end of fifth section 80 of internal passageway 33 and ultimately back into waterline 300.

The activities experienced by the water within internal passageway 33 (i.e. going from larger diameter first section to smaller diameter second section, having to turn to go to the third section, pushing on the disk to compress the spring and/or turning again in the fourth section, etc.), causes a back pressure in waterline 300 which collapses the air bubbles (i.e. some or most of the air bubbles) preferably at the point in water line 300 just before the point where the water with air bubbles would enter water meter 100, such that the meter reading is more accurate as the air bubbles have virtually eliminated or significantly reduced.

With the smaller diameter fourth section 70 leading into a larger diameter fifth section 80 the water entering into fifth section 80 and back into water line 300 (i.e. out of fifth section 80) can be at a high pressure to return the water flow to a normal flow level once the water leaves valve 20.

The collapsing of the water and control of the flow of the water just prior to water meter 100 also causes the water entering into the water to have less of a "wear and tear" effect on water meter 100 and thus can extend the life of water meter 100 as an additional benefit of using the disclosed novel water valve 20.

In the valve "closed" position, with disk 94 resting against the third section 60 wall and covering opening 62, when water travels through waterline 300 at a pressure higher than the pressure set from the spring tension, the contacting of the water against disk 94, causes spring 96 to compress and the disk 94 retract, such that disk 94 is no longer blocking fluid communication between the second section 50 and third section 60 and in this configuration valve 20 is now considered to be in a valve "opened" or "open" position, which permits the water to continue to travel through and out of the valve body to its ultimate destination (i.e. the building, etc.).

The contacting of the water against disk 94, in the "closed" or "opened" position of valve 20, alone or in conjunction with the one or more turns that the water has to make while traveling through internal passageway 33 in valve body 30 can cause and create the back pressure which is used to collapse the air bubbles at the point in waterline 300 preferably just before the water is read by the associated water meter 100 also connected to waterline 300. Thus, water meter 100 reads basically only the volume of water that is passing through, as there is preferably a negligible amount of air in the water at the point the water passes through meter 100. This preferably results in the building's owner's water bill to be a relatively much lower amount as compared to if no valve 20 had been positioned just pass meter 100 in waterline 300, and also the controlling of the speed of the water flow/creating a laminar flow also can result in less impact on the water meter mechanical parts which may cause the useful life of water meter 100 to be extended.

Preferably, water flow valve 20 is disposed within a waterline 300 between a water meter 100 and the dwelling/building associated with water meter 100 that receives water from waterline 300.

Preferably internal passageway 33 can have a substantially circular cross-sectional shape in its different sections, though such is not considered limiting and other shapes can be selected and are considered within the scope of the invention.

The varying diameter sizes for the sections of the internal passageway 33 also helps to create the back pressure in the waterline to collapse the air bubbles just prior to the bubbles reaching water meter 100.

Body 30, disk 94, spring 96 and cap/cover 98 can be preferably constructed from stainless steel, though such is not considered limiting, and other materials can be selected and are considered within the scope of the invention. In a preferred, though non-limiting, embodiment the material selected can be a 316L stainless steel, with the "L" referring to a low carbon stainless steel.

Valve 20 is positioned after water meter 100 and in between water meter 100 and the building (e.g. house, office building, etc.) that is associated with water member 100. Preferably, the outer diameter of body 30 can be chosen to correspond to or be virtually the same (but smaller so it fits within) as the inner diameter of the pipe 300 of the waterline of water distribution system to which it is position within to provide for a water tight/sealed or virtually water tight/sealed connection between valve 20 and pipe 300. This causes the water flowing through water line pipe 300 to be directed into first passageway 40 at the point where valve 20 is positioned as opposed to avoiding valve 20 by going between the valve body 30 and pipe 300. Lip 32 of body member 30 also helps to direct the flowing water into first passageway 40 and also helps to block water from flowing between valve 20 and pipe 300. Preferably, body 30 comprises a one-piece body member. Thus, valve 20 can be preferably located downstream of meter 100.

Though stainless steel (preferably low carbon version) is the preferred material such is not considered limiting, and other materials, including, without limitation, brass, other stainless steel, plastic, PVC, etc, can also be used for some or all of the above described parts and such other materials are considered within the scope of the disclosure.

All locations, sizes, shapes, proportions, measurements, amounts, angles, component locations, part locations, fasteners, configurations, weights, dimensions, values, percentages, ranges, materials and/or orientations discussed above or shown in the drawings are merely by way of example and are not considered limiting and other locations, sizes, shapes, proportions, measurements, amounts, angles, component locations, part locations, fasteners, configurations, weights, dimensions, values, percentages, ranges, materials and/or orientations can be chosen and used and all are considered within the scope of the invention.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the novel valve invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A water flow valve disposed within a waterline for reducing the amount of air volume in water prior to the water being read by a water meter that is also disposed within the waterline, said water flow valve comprising:
   a valve body member having an open first end and an open second end, a length extending from the first end to the second end, and an internal passageway extending from the first end to the second end of the valve body member and having a non-linear shape, the internal passageway having a first section having a first diameter with the open first end of the valve body member also constituting the open first end of the first section, the first section having an open second end which is smaller in size as compared to a size of the first open end of the first section, the first section terminating into a second section of the internal passageway, the second section having a diameter that is smaller in size as compared to the diameter of the first section, the open second end of the first section also constituting a open first end of the second section, the second section having a closed second end position and an internal sidewall extending from the open first end of the second section to at least near the closed second end of the second section, the internal sidewall of the second section defining an internal opening, the internal opening positioned perpendicular to an orientation of the first open end of the second section, the internal passageway having a third section positioned perpendicular to the second section of the internal passageway, the internal opening in the internal sidewall of the second section also constituting a first open end for a third section of the internal passageway, the third section having an internal sideway extending from the first open end of the third section to a second end of the third section, the internal sideway of the third section defining a second internal opening, the second internal opening also constituting a first open end of a fourth section of the internal passageway, the fourth section positioned perpendicular to the third section and parallel with the second section of the internal passageway, the fourth section having an open second end which also constitutes a first opening at a first end of a fifth section of the internal passageway, the second open end of the valve body also constituting a second open end of the fifth section, the fifth section having a diameter that is larger than a diameter of the fourth section and virtually a same diameter size as the first section;
   wherein the non-linear shape of the internal passageway causes water running through the valve to have to turn at least twice when traveling through the internal passageway from the first end to the second end of the internal passageway,
   a blocking member disposed within the third section of the internal passageway, the blocking member being sized larger than a size for the internal opening and in a valve "closed" position the blocking member is fully covering the internal opening to cutoff fluid communication between the second section of the internal passageway and the third section of the internal passageway; and
   a spring disposed and retained within the third section of the internal passageway and exerting pressure against the blocking member to maintain the blocking member over the internal opening in the valve closed position, wherein the spring is positioned substantially perpendicular to a length of the body member extending from the first end to the second end of the body member.

2. The water flow valve of claim 1 wherein a tension setting for the spring establishes a threshold water pressure level which must be met in order to cause the spring to compress and retract the blocking member to permit communication between the second section of the internal passageway and the third section of the internal passageway (valve "opened" position).

3. The water flow valve of claim 1 wherein in a valve "opened" position water traveling within the waterline meets or exceeds a threshold water pressure level determined by a tension setting for the spring and upon contact of said water with the blocking member the blocking member is retracted to permit the water to travel through the internal passageway.

4. The water flow valve of claim 3 wherein the contact of the water with the blocking member creates back pressure in the waterline at a point prior to a water meter location which collapses or compresses at least some air bubbles in the water prior to the water traveling into the water meter such that an amount of air volume read by a meter is reduced.

5. The water flow valve of claim 1 wherein the blocking member is a disk member.

6. The water flow valve of claim 1 wherein the valve body having an externally accessible opening at a point along valve body member intermediate of the first open end and the second open end of the valve body member, the externally accessible opening also constituting the second end for the third section.

7. The water flow valve of claim 1 wherein the body member having a lip member at a first end which extends outward from a remaining portion of the body member and is substantially perpendicularly oriented with respect to a length of the body member.

8. The water flow valve of claim 7 wherein said valve body having an outer diameter which is smaller than an inner diameter of the waterline to allow the valve body to be inserted within the waterline exclusive of the lip member which is adapted to be adjacent to an end of the waterline when the valve body is properly inserted within the waterline.

9. The water flow valve of claim 1 wherein said valve body constructed from 316L stainless steel material.

10. The water flow valve of claim 6 further comprising a cap member that is secured within and seals the externally accessible opening and helps to retain the spring in position within the third section of the internal passageway.

11. A water flow valve disposed within a waterline for reducing the amount of air volume in water prior to the water being read by a water meter that is also disposed within the waterline, said water flow valve comprising:

a valve body member having an open first end and an open second end, a length extending from the first end to the second end, and an internal passageway extending from the first end to the second end of the valve body member and having a non-linear shape, the internal passageway having a first section having a first diameter with the open first end of the valve body member also constituting the open first end of the first section, the first section having an open second end which is smaller in size as compared to a size of the first open end of the first section, the first section terminating into a second section of the internal passageway, the second section having a diameter that is smaller in size as compared to the diameter of the first section, the open second end of the first section also constituting a open first end of the second section, the second section having a closed second end position and an internal sidewall extending from the open first end of the second section to at least near the closed second end of the second section, the internal sidewall of the second section defining an internal opening, the internal opening positioned perpendicular to an orientation of the first open end of the second section, the internal passageway having a third section positioned perpendicular to the second section of the internal passageway, the internal opening in the internal sidewall of the second section also constituting a first open end for a third section of the internal passageway, the third section having an internal sideway extending from the first open end of the third section to a second end of the third section, the internal sideway of the third section defining a second internal opening, the second internal opening also constituting a first open end of a fourth section of the internal passageway, the fourth section positioned perpendicular to the third section and parallel with the second section of the internal passageway, the fourth section having an open second end which also constitutes a first opening at a first end of a fifth section of the internal passageway, the second open end of the valve body also constituting a second open end of the fifth section, the fifth section having a diameter that is larger than a diameter of the fourth section and virtually a same diameter size as the first section;

wherein the non-linear shape of the internal passageway causes water running through the valve to have to turn at least twice when traveling through the internal passageway from the first end to the second end of the internal passageway, a blocking member disposed within the third section of the internal passageway, the blocking member being sized larger than a size for the internal opening and in a valve "closed" position the blocking member is fully covering the internal opening to cutoff fluid communication between the second section of the internal passageway and the third section of the internal passageway;

a spring disposed and retained within the third section and exerting pressure against the blocking member to maintain the blocking member over the opening in a valve closed position, wherein the spring is positioned substantially perpendicular to a length of the body member extending from the first end to the second end of the body member;

wherein in a valve "opened" position fluid communication is provided between the second section and the third section and in a valve "closed" position the blocking member is positioned over and fully covering the opening to cut off fluid communication between the second section and the third section;

wherein the valve body having an externally accessible opening at a point along valve body member intermediate of the first open end and the second open end of the valve body member, the externally accessible opening also constituting the second end for the third section; and a cap member that is secured within and seals the externally accessible opening and helps to retain the spring in position within the third section of the internal passageway.

12. The water flow valve of claim 11 wherein a tension setting for the spring establishes a threshold water pressure level which must be met in order to cause the spring to compress and retract the blocking member to permit communication between the second section and the third section of the internal passageway (valve "opened" position); wherein in a valve "opened" position water traveling within the waterline meets or exceeds a threshold water pressure level caused by the tension setting for the spring and upon contact of the water with the blocking member the spring is compressed and the blocking member is retracted to permit the water to travel through the internal passageway.

13. The water flow valve of claim 12 wherein the contact of the water with the blocking member creates back pressure in the waterline at a point prior to a water meter location which collapses or compresses a substantial number of air bubbles in the water prior to the water traveling into the water meter such that an amount of air volume read by a meter is reduced.

14. The water flow valve of claim 11 wherein the blocking member is a disk member.

15. The water flow valve of claim 11 wherein said valve body having an outer diameter which is smaller than an inner diameter of the waterline to allow the valve body to be inserted within the waterline exclusive of the lip member which is adapted to be adjacent to an end of the waterline when the valve body is properly inserted within the waterline.

16. The water flow valve of claim 11 wherein said valve body constructed from 316L stainless steel material.

17. A method for reducing the amount of air in a fluid as the fluid passes through a water meter in communication with a fluid line that the fluid is traveling through, said method comprising the steps of:

(a) positioning a valve within a fluid line adjacent or near a water meter in communication the fluid line, the valve having a valve body with a spring and contact member disposed within a non-linear internal passageway extending from a first end of the valve body to a second opposite end of the valve body, the internal passageway having a first section having a first diameter with the open first end of the valve body member also constituting the open first end of the first section, the first section having an open second end which is smaller in size as compared to a size of the first open end of the first section, the first section terminating into a second section of the internal passageway, the second section having a diameter that is smaller in size as compared to the diameter of the first section, the open second end of the first section also constituting a open first end of the second section, the second section having a closed second end position and an internal sidewall extending from the open first end of the second section to at least near the closed second end of the second section, the internal sidewall of the second section defining an internal opening, the internal opening positioned perpendicular to an orientation of the first open end of the second section, the internal passageway having a third section positioned perpendicular to the second section of the internal passageway, the internal opening in the internal sidewall of the second section also constituting a first open end for a third section of the internal passageway, the third section having an internal sideway extending from the first open end of the third section to a second end of the third section, the internal sideway of the third section defining a second internal opening, the second internal opening also constituting a first open end of a fourth section of the internal passageway, the fourth section positioned perpendicular to the third section and parallel with the second section of the internal passageway, the fourth section having an open second end which also constitutes a first opening at a first end of a fifth section of the internal passageway, the second open end of the valve body also constituting a second open end of the fifth section, the fifth section having a diameter that is larger than a diameter of the fourth section and virtually a same diameter size as the first section; and (b) reducing an amount of air volume within the fluid as the fluid passes through the water meter by contacting the fluid with the internal contact member of the valve.

18. The method for reducing the amount of air in a fluid of claim 17 further comprising the step of allowing the fluid to continue to travel within the fluid line beyond the valve when the fluid is traveling at a certain pressure.

19. The method for reducing the amount of air in a fluid of claim 17 wherein said internal contact member is positioned within the third section of the internal passageway initially in a valve "closed" position through tension of the spring in an uncompressed configuration, and the method further comprising the step of (c) moving the internal contact member to a valve "opened" position when the fluid is traveling at a certain pressure within the fluid line.

20. The method for reducing the amount of air in a fluid of claim 17 wherein step (a) comprises positioning the valve within the fluid line between the water meter and the building to which the water meter is associated with.

* * * * *